April 13, 1926.  1,580,593
T. M. EYNON
INDICATOR FOR AUTOMOBILE GAS SUPPLY
Filed March 17, 1921  2 Sheets-Sheet 1
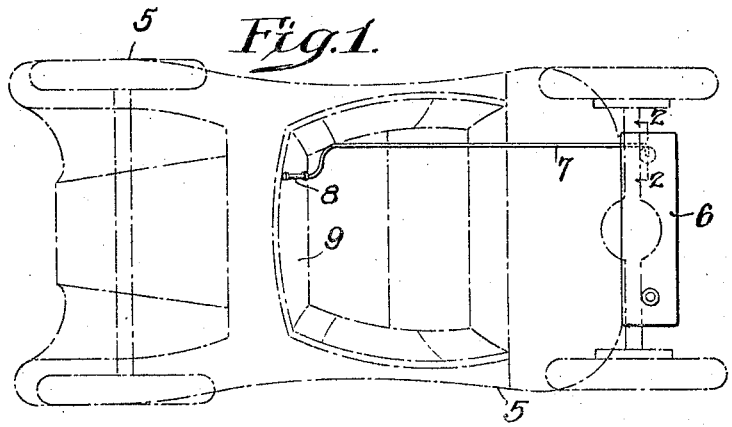
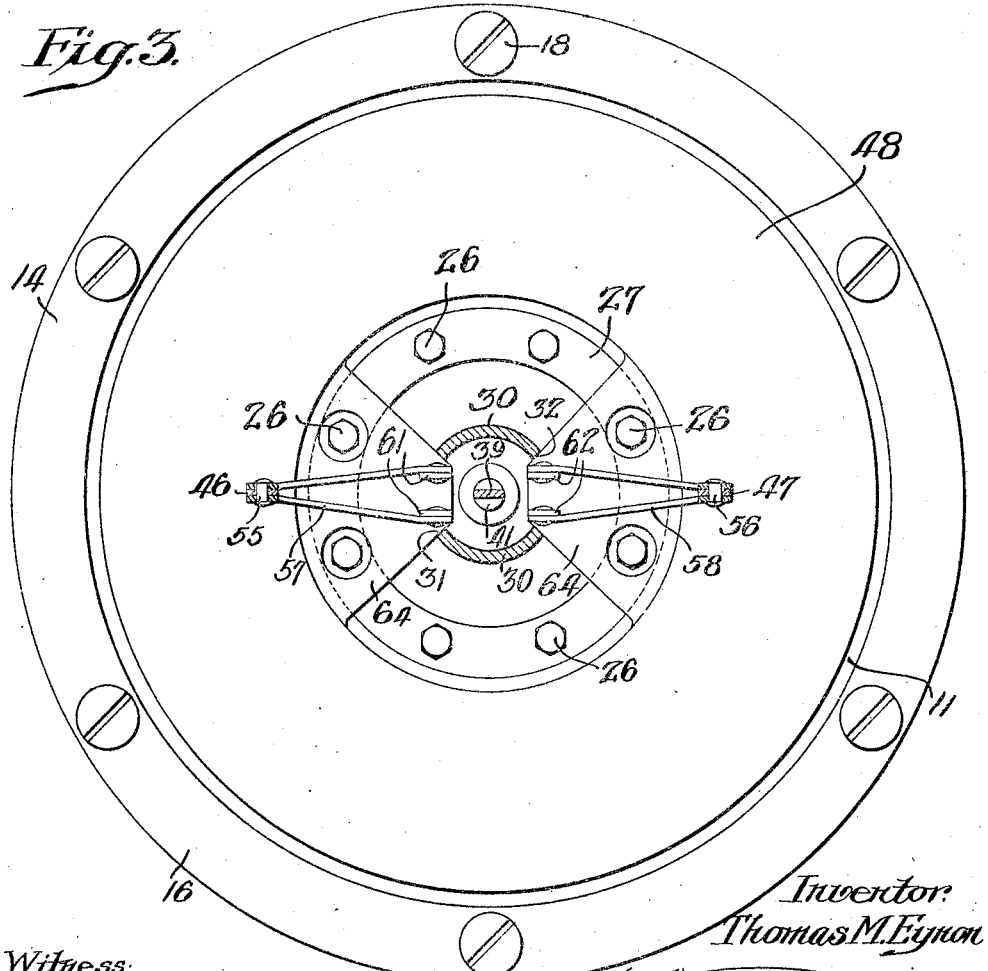
Inventor
Thomas M. Eynon
Attorney

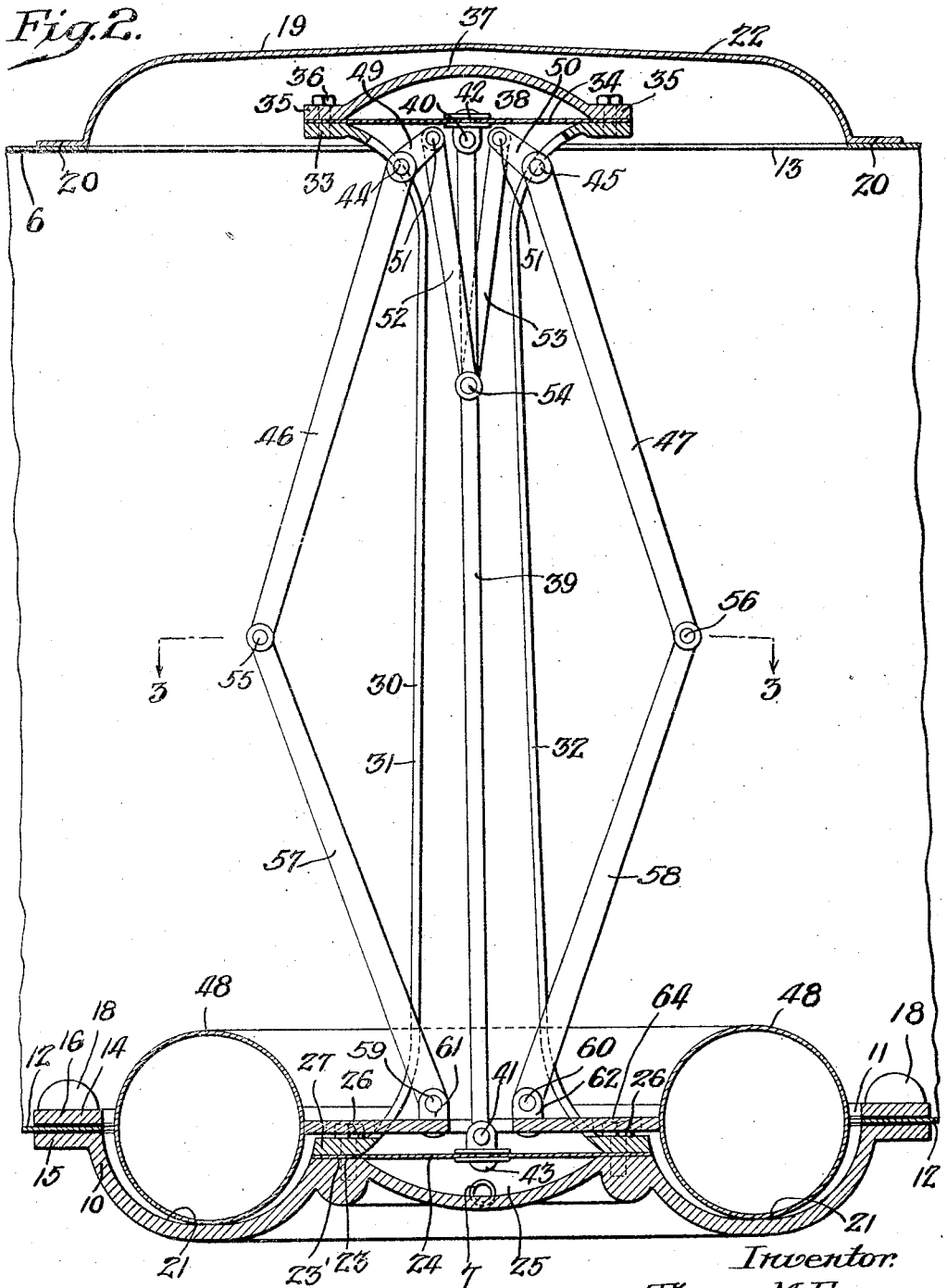

Patented Apr. 13, 1926.

1,580,593

UNITED STATES PATENT OFFICE.

THOMAS M. EYNON, OF PHILADELPHIA, PENNSYLVANIA.

INDICATOR FOR AUTOMOBILE GAS SUPPLY.

Application filed March 17, 1921. Serial No. 453,166.

*To all whom it may concern:*

Be it known that I, THOMAS M. EYNON, a citizen of the United States, residing at Philadelphia, in the county of Philadelphia and State of Pennsylvania, have invented a certain new and useful Indicator for Automobile Gas Supply, of which the following is a specification.

My invention relates to devices intended to show the height of gasoline in an automobile tank upon an indicator located at a convenient place for observation by the automobile driver, preferably upon or near the dash-board.

The purpose of my invention is to provide a relatively flat float so as to reduce the projection of the top and bottom of the float at the limits of its travel and to more accurate indication of level at the top and bottom of the tank without excessive projection of the tank above or below its normal level.

A further purpose is to guide a vertically movable float by the same levers by which its lifting is made to effect the registration upon an indicator.

A further purpose is to operate a fluid height-indicator moved by a diaphragm through levers clustered about the space above the float.

A further purpose is to operate an indicating diaphragm by means of lever and link connections of the lazy tongs type.

These purposes may be carried out with or without compensation for the movement of the diaphragm to avoid the effect upon the pressure or vacuum conditions within the tank.

Further purposes will appear in the specifications and in the claims.

My invention relates both to the combination by which the movement of the diaphragm is obtained and also to the particular kind of float by which the invention is made effective.

I have preferred to illustrate my invention by one form only, selecting a form thereof which is practical, efficient, inexpensive and thoroughly reliable and which at the same time well illustrates the principles of my invention.

Figure 1 is a top plan skeletoned view of an automobile to which my invention is applied.

Figure 2 is a section upon line 2—2 of Figure 1 showing a preferred form of my construction.

Figure 3 is a section of Figure 2 taken upon line 3—3.

In the drawings similar numerals indicate like parts.

The automobile 5 is intended to be typical of the various types of automobiles to all of which my invention may be applied. Though the invention is well suited for cars having tanks of any shape, it offers special advantage where the tanks are relatively high as compared with their length and width.

The tank at 6 connects by a pipe 7 with any one of a variety of fluid indicators 8 upon the dash 9, so that the quantity or pressure of the fluid in the pipe may be indicated. The simplest form of such an indicator, the gauge glass, is my preferred form.

My device is not only capable of being built into a new tank but can also be applied to the tank of an existing automobile. For convenience in either of these, I show a removable closure 10 for an opening 11 in the tank bottom 12. The opening may be of any shape and is here circular.

The closure is intended to provide a base or support for the other parts, well suited for insertion of the device within an existing tank. However, in that case the bottom opening should be elongated or the top opening 13 should be larger than the bottom opening in order to provide conveniently for the insertion of the inner flange member 14. The metal about the edge of the opening is clamped between the flanges 15 and 16 of the closure, and the parts are held together by bolts fitting into but not through nuts in the form of integral bosses or lugs 18 upon the interior flange at intervals, protecting against leakage.

In this form I have provided a cap 19 also for the tank here shown as brazed to the tank as at 20 but which may be applied in any suitable way, as in the case of the bottom.

In order to give room for part of the float to fall below the bottom of the tank when the tank is empty and to rise above the top of the tank when the tank is full so as to give accurate indication of the height of gasoline throughout the entire range, both the bottom and the top are extended outside of the tank. This is accomplished at the bottom by means of an annular recess at 21 and at the top by lifting the cap above the tank at 22.

The portion of the closure inside of the depression 21 is raised to form a seat 23 for a diaphragm 24 but is lowered beneath the diaphragm to form a recess 25 to which pipe 7 is connected. The seat 23 is stiffened by a ring of metal 23′ which is drilled part way through from the top and is tapped to receive bolts 26 by which the diaphragm-retaining ring 27 is held in place.

The retaining ring 27 not only holds the diaphragm tightly against its seat to seal it—with or without packing—but affords a base and support for the operating mechanism by which the diaphragm is moved. The edges (preferably the inner edges) of the ring are turned upwardly in the form of a pillar or standard 30, illustrated as tubular and as slotted or cut at opposite sides at 31 and 32 to provide room for movement of lever arms hereinafter described.

At the upper end of this pillar I flare it outwardly to form an annular flange 33, which affords a lower seat for the diaphragm 34, which is clamped between flange 33 and a flange 35 by means of bolts 36. Packing may be used if needed. The cover 37, integral with flange 35 provides a space 38 above the diaphragm.

The two diaphragms 24 and 34 are connected by a rod or strip 39 which may be pivoted at 40 and 41 to buttons 42 and 43 by which the actual connection with the diaphragm is made. As a result of the connection the diaphragms will move in the same direction with opposite effects. When the lower diaphragm moves downwardly to increase the volume of the tank available for the gasoline, the upper diaphragm moves in the same direction to correspondingly reduce that volume, and when the lower diaphragm moves upwardly, relatively reducing the volume available for gasoline, the upper diaphragm moves in the same direction to correspondingly increase this volume; with the purpose and effect that the capacity of the tank is unaffected by the movements of the diaphragms and is independent of them.

As a result of this my mechanism does not affect and is not affected by the pressure or vacuum conditions there and is free from error by variation of such pressure or vacuum.

Near the upper end of the column or standard 30, I provide pivots such as at 44 and 45 for the upper sections 46, 47 of any desired number of the composite arms, preferably more than one, so that two or more of these arms together may be effective to act as a guide for a float 48 and separate guiding mechanism is not required. So far as mere operation of the diaphragm is concerned, a single one of these levers 46 or 47 only would be required in connection with suitable guiding mechanism to keep the float in proper direction of the movement and to operate the diaphragm or diaphragms. I find that two arms are sufficient for the purpose of both guiding and operating the mechanism and therefore show but two.

The upper sections 46 and 47 of these arms are extended beyond the pivots as at 49 and 50, so as to connect with rod 39 through pins 51, thrust rods or strips 52 and 53 and pin 54.

The upper sections 46 and 47 connect with the float through pins 55 and 56, lower sections 57 and 58, pins 59 and 60 and ears 61 and 62.

The life preserver form of float which has been shown has special advantages in the height of tank occupied. While the float has this special advantage, I recognize that the remainder of my mechanism would be operative and highly advantageous with a different form of float and that the shape of the float does not enter into the invention as defined in some of the claims, but only where the character of the float cooperates with the rest of the structure to require less extension above the top or below the bottom of the tank.

The hollow ring 48 is connected with the ears 61, 62 by means of a web or strip 64.

In operation, the ring float rests within a comparatively shallow annular space at the bottom and within a comparatively shallow extension at the top, yet registers the lowest and highest levels of the gasoline in the tank. Between these limits the float moves practically in a vertical line, guided by the link-and-lever arms duplicated at the right and left in the drawing.

As the float moves upwardly it spreads the links 57 and 58 and the arms 46, 47, with the result that the lever arms 49 and 50 are moved downwardly, with corresponding downward projection of the rod 39 and downward movement of both diaphragms. The device could be arranged to have either diaphragm operate the gauge. As arranged, the space 26 below the lower diaphragm is connected with the dash-board indicator by means of the pipe 7 and the system is filled with a suitable fluid. The gauge is connected up so that different heights of the gasoline in the tank corresponds to different positions of the diaphragm. The gauge may indicate by direct fluid flow into a sight tube as shown, lifting the indicating liquid in said tube with pressure upon the diaphragm, or otherwise as preferred. The effect upon the indicator will be nearly proportional to the height of the float in the tank and any discrepancy between this and the actual height reading may be accommodated by suitably calibrating the indicator at the dashboard. This calibration however, will not ordinarily be required as the operator of the car will be much more desirous of determining the approximate condition of the gasoline in the tank, to learn whether or not the tank requires refilling, then he will be able to obtain an exact reading as to the quantity of gasoline in the tank. If an exact reading be desired the calibration will effect this.

When the height of gasoline falls in the tank and the float drops there will be a corresponding lifting of the rod 39, lifting the diaphragm, and a consequent return flow of the fluid which had been transmitted to the indicator at the front, or a corresponding relief of the pressure which had been placed upon the fluid in the indicating system; so that the indication system will show that there is a smaller quantity of gasoline in the tank.

In view of my disclosure herein other forms of practicing my invention will obviously occur to those skilled in the art, either better suited to the particular use intended by the designer or suiting merely his whim or preference, or for the purpose of appropriating my invention unfairly, and it is my purpose to include herein all such variations of my invention, whether securing the advantage of the invention entirely or not, as come within the spirit and scope of my invention.

Having thus described my invention, what I claim as new and desire to secure by Lettters Patent is:—

1. In an indicator system for the height of gasoline in an automobile tank, a fluid indicator, a fluid connection therewith, a diaphragm controlling the movement of fluid in said connection, an annular float with whose axis the center of the diaphragm is in line, a tank for the fluid of which tank the diaphragm forms one wall and connections between the float and diaphragm whereby lifting and lowering of the float operate the diaphragm to give indication upon the indicator.

2. In an indicator system for the height of gasoline in an automobile tank, a fluid indicator, a fluid connection therewith, a diaphragm controlling the movement of fluid in said connection, an annular float with whose axis the center of the diaphragm is in line, a tank for the fluid of which tank the diaphragm forms one wall, said tank having accommodation for part of the height of the float at top and bottom and connections between the float and diaphragm whereby lifting and lowering of the float operate the diaphragm to give indication upon the indicator.

3. In an indicator for the height of gasoline in an automobile tank, a fluid-operated indicator, a diaphragm, walls cooperating with it to form a compartment, fluid transmission connections from the indicator to the compartment, a support, a rod connected with the diaphragm, a lever pivoted at an intermediate point upon the support and connected at one end with the rod, a float and a link, connecting the float with the opposite end of said lever, whereby the lifting of the float causes outward movement of the link and said opposite lever end and movement of the diaphragm.

4. In an indicator system for the height of gasoline in an automobile tank, a fluid-operated indicator and fluid connections, a diaphragm adapted to operate the fluid inside the connections to give indication, a float, a plurality of links each connected at one end with said float, a plurality of levers having one end of each lever connected to the opposite end of one of said links, to move the links and levers ends outwardly with lifting of the float and inwardly with depression of the float and operative connection from the said levers to said diaphragm whereby the diaphragm is operated from said float to change the indication.

5. In an indicator for the height of gasoline in an automobile tank, a fluid indicator and fluid connections, a diaphragm adapted to operate the fluid in the connections, a float, a plurality of links connected with the float, a corresponding plurality of levers having one end of each lever pivotally connected with one end of one of the links, a pillar independent of the float, pivotal support for said levers in said pillar, a rod connected with the diaphragm and connections from said levers to said rod whereby the float is guided by said levers and links and at the same time movement of the diaphragm is controlled by the height of the float.

6. In an indicator system for the height of gasoline in an automobile tank, a tank, a closure for the tank having a depression and a surrounding diaphragm seat, a diaphragm upon the seat, a standard mounted upon the closure, a float above the closure, levers carried by the standard, links connecting the levers with the float, connections between the levers and the diaphragm and a dash-board gauge operated by movement of the diaphragm.

7. In an indicator for the height of gasoline in an automobile tank, a tank closure having a diaphragm seat and a space for liquid within the seat, a diaphragm on the seat, a standard mounted above the diaphragm, a float surrounding the standard, levers carried by the standard, links connecting the levers with the float, connections from the levers to the diaphragm, indicating fluid connections from the space within the seat and fluid connections from the depression to the gage.

8. In an indicator for the height of gasoline in an automobile tank, a tank closure having a diaphragm seat and a space for liquid within the seat, a diaphragm on the seat, a standard mounted above the diaphragm, a float surrounding the standard, levers carried by the standard, a second diaphragm seat carried by the standard, a diaphragm thereon, a cover for the diaphragm providing a space between the diaphragm and cover and connections from the levers to operate the diaphragms in unison.

9. In an indicator system for the height of gasoline in an automobile tank, a tank, a diaphragm seat in the bottom of the tank having a space provided within the seat, a diaphragm upon the seat, a standard above the diaphragm, a ring float surrounding the standard and lever and link connections between the float and diaphragm having pivotal connection and support in the upper part of the standard.

10. In an indicator for the height of gasoline in an automobile tank, a ring float, links connected thereto, levers connected with the links, a support for the levers, diaphragm seats above and below the lever support, diaphragms thereon, a cover for one side of each diaphragm to provide a space between the diaphragm and cover, a rod connecting the diaphragms and a connection between the rod and levers to operate the diaphragms in unison with movement of the float.

THOMAS M. EYNON.